United States Patent
Hu et al.

(10) Patent No.: US 9,058,776 B2
(45) Date of Patent: Jun. 16, 2015

(54) LED BACKLIGHT SOURCE AND LIQUID CRYSTAL DEVICE

(71) Applicant: Shenzhen China Star Optoelectronics Technology Co., Ltd., Shenzhen, Guangdong (CN)

(72) Inventors: Anle Hu, Shenzhen (CN); Dan Cao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/006,315

(22) PCT Filed: Aug. 8, 2013

(86) PCT No.: PCT/CN2013/081056
§ 371 (c)(1),
(2) Date: Sep. 20, 2013

(87) PCT Pub. No.: WO2015/018021
PCT Pub. Date: Feb. 12, 2015

(65) Prior Publication Data
US 2015/0042925 A1    Feb. 12, 2015

(51) Int. Cl.
*H05B 37/00*    (2006.01)
*H05B 39/00*    (2006.01)
*H05B 41/00*    (2006.01)
*G09G 3/34*    (2006.01)
*H05B 33/08*    (2006.01)

(52) U.S. Cl.
CPC .......... *G09G 3/3406* (2013.01); *H05B 33/0887* (2013.01)

(58) Field of Classification Search
None
See application file for complete search history.

(56) References Cited

U.S. PATENT DOCUMENTS

2013/0050174 A1*    2/2013    Kim et al. ................. 345/212

FOREIGN PATENT DOCUMENTS

| CN | 1722560 A | 1/2006 |
|---|---|---|
| CN | 202941027 U | 5/2013 |
| CN | 103218976 A | 7/2013 |

* cited by examiner

*Primary Examiner* — Jany Richardson
(74) *Attorney, Agent, or Firm* — Andrew C. Cheng

(57) ABSTRACT

A LED backlight source and a liquid crystal device are disclosed. The LED backlight source includes: a boost circuit for boosting an input DC voltage and for outputting the boosted DC voltage; a plurality of LED strings connected in parallel, wherein each of the LED strings comprises a plurality of serially connected LEDs and a first resistor, and each of the LED strings receives the boosted DC voltage from the boost circuit; an over-current protection circuit for controlling an output power of the boost circuit according to a detected resistance; and a short-connection protection circuit for adjusting the resistance detected by the over-current protection circuit according to a voltage at two ends of the first resistor.

14 Claims, 3 Drawing Sheets

LED BACKLIGHT SOURCE AND LIQUID CRYSTAL DEVICE

BACKGROUND OF THE INVENTION

1. Field of the Invention

The present disclosure relates to liquid crystal display technology, and more particularly to a LED backlight source and a liquid crystal device (LCD).

2. Discussion of the Related Art

With the technology revolution, backlight technology of LCDs are developed. Typical LCDs adopt cold cathode fluorescent lamps (CCFL) as the backlight. However, as the CCFL backlight is characterized by attributes including low color reduction ability, low lighting efficiency, high discharging voltage, bad discharging characteristics in low temperature, and also, the CCFL needs a long time to achieve a stable gray scale. As such, LED is a new developed backlight technology.

Regarding the LED backlight source, a plurality of LED strings are arranged behind the liquid crystal panel. Each of the LED string includes a plurality of LEDs serially connected. Specific driving circuits are needed to provide driving voltage to the LED strings.

FIG. 1 is a schematic view of a conventional LED backlight source adopted in LCDs. As shown, the LED backlight source includes a backlight driving integrated circuit 110, a boost circuit 120, a plurality of LED strings 130. Each of the LED string 130 includes a plurality of LEDs and a resistor R1.

The boost circuit 120 is for boosting the inputted direct current (DC) voltage to drive the LED strings 130. The backlight driving integrated circuit 110 controls the duty cycle of the driving signals provided to the boost circuit 120 according to the voltage at two ends of the resistor R1 of one of the LED string 130. In this way, the voltage provided from the boost circuit 120 to each of the LED strings 130 is controlled.

In addition, an over-current protection end of the backlight driving integrated circuit 110 connects between the boost circuit 120 and the resistor R2 to provide the over-current protection function. When one of the resistor R1 of the LED strings 130 is short-connected, the current of one of the LED string 130 may be extremely huge such that the output power of the boost circuit 120 may increase dramatically. Under the circumstance, the electrical components within the driving circuit may be burn out and even results in fire. Thus, the output power of the boost circuit 120 has to be reduced when the resistor R1 of the LED string 130 is short-connected so as to enhance the safety and reliability.

SUMMARY

In one aspect, a LED backlight source for a liquid crystal device includes: a boost circuit for boosting an input DC voltage and for outputting the boosted DC voltage; a plurality of LED strings connected in parallel, wherein each of the LED strings includes a plurality of serially connected LEDs and a first resistor, and each of the LED strings receives the boosted DC voltage from the boost circuit; an over-current protection circuit for controlling an output power of the boost circuit according to a detected resistance; and a short-connection protection circuit for adjusting the resistance detected by the over-current protection circuit according to a voltage at two ends of the first resistor.

Wherein when the voltage at two ends of the first resistor of one of the LED strings is smaller than a first reference voltage, the short-connection protection circuit increases the resistance detected by the over-current protection circuit so as to reduce the output power of the boost circuit, and when the voltage at two ends of the first resistor of one of the LED strings is greater than the first reference voltage, the short-connection protection circuit decreases the resistance detected by the over-current protection circuit so as to increase the output power of the boost circuit.

Wherein the short-connection protection circuit includes: a detecting circuit for comparing the voltage at two ends of the first resistor of each of the LED strings with the first reference voltage and for outputting different level signals based on a comparison result; a switch circuit for adjusting the resistance detected by the over-current protection circuit according to the level signals output from the detecting circuit; and wherein when the voltage at two ends of first resistor of each of the LED strings are greater than the first reference voltage, the detecting circuit outputs low level signals, and when the voltage at two ends of first resistor of the LED strings are smaller than the first reference voltage, the detecting circuit outputs high level signals, and the switch circuit increases the resistance detected by the over-current protection circuit.

Wherein the detecting circuit includes: a plurality of comparators for comparing the voltage at two ends of the corresponding first resistor of the LED strings with the first reference voltage; an OR circuit for outputting different level signals according to the level signals output from each of the comparators; and wherein when the voltage at two ends of the first resistor of each of the LED strings are greater than the first reference voltage, each of the comparator and the OR circuit output the low level signal, and when the voltage at two ends of the first resistor of one of the LED strings is smaller than the first reference voltage, the comparator corresponding to one of the LED string and the OR circuit outputs high level signal.

Wherein the switch circuit includes a second resistor, a third resistor, a second MOS transistor, and a third MOS transistor; and wherein one end of the second resistor connects to one end of the fourth resistor, the other end of the second resistor connects to the drain of the second MOS transistor, a source of the second MOS transistor connects to the other end of the fourth resistor, a gate of the second MOS transistor connects to a drain of the third MOS transistor, the source of the third MOS transistor is grounded, and the gate of the third MOS transistor connects to an output end of the OR circuit.

Wherein the short-connection protection circuit further includes a signal enhancement circuit for increasing the level signals output by the OR circuit and for outputting the enhanced level signals to the switch circuit.

Wherein the signal enhancement circuit may be a Totem Pole circuit.

Wherein the signal enhancement circuit includes a first triode and a second triode, and wherein an emitter of the first triode connects together with the emitter of the second triode, and connects to the switch circuit, a base of the first transistor connects together with the base of the second transistor and then connects to the output end of the OR circuit, a collector of the first triode receives a third reference voltage, and the collector of the second triode is grounded.

In another aspect, a liquid crystal device comprising a LED backlight source and a liquid crystal panel arranged opposite to the LED backlight source, the LED backlight source provides a light source to the liquid crystal panel such that the liquid crystal panel is capable of displaying images, the LED backlight source including: a boost circuit for boosting an input DC voltage and for outputting the boosted DC voltage; a plurality of LED strings connected in parallel, wherein each of the LED strings includes a plurality of serially connected LEDs and a first resistor, and each of the LED strings receives the boosted DC voltage from the boost circuit; an over-current protection circuit for controlling an output power of the boost circuit according to a detected resistance; and a short-connection protection circuit for adjusting the resistance detected by the over-current protection circuit according to a voltage at two ends of the first resistor.

Wherein when the voltage at two ends of the first resistor of one of the LED strings is smaller than a first reference voltage, the short-connection protection circuit increases the resistance detected by the over-current protection circuit so as to reduce the output power of the boost circuit, and when the voltage at two ends of the first resistor of one of the LED strings is greater than the first reference voltage, the short-connection protection circuit decreases the resistance detected by the over-current protection circuit so as to increase the output power of the boost circuit.

Wherein the short-connection protection circuit includes: a detecting circuit for comparing the voltage at two ends of the first resistor of each of the LED strings with the first reference voltage and for outputting different level signals based on a comparison result; a switch circuit for adjusting the resistance detected by the over-current protection circuit according to the level signals output from the detecting circuit; and wherein when the voltage at two ends of first resistor of each of the LED strings are greater than the first reference voltage, the detecting circuit outputs low level signals, and when the voltage at two ends of first resistor of the LED strings are smaller than the first reference voltage, the detecting circuit outputs high level signals, and the switch circuit increases the resistance detected by the over-current protection circuit.

Wherein the detecting circuit includes: a plurality of comparators for comparing the voltage at two ends of the corresponding first resistor of the LED strings with the first reference voltage; an OR circuit for outputting different level signals according to the level signals output from each of the comparators; and wherein when the voltage at two ends of the first resistor of each of the LED strings are greater than the first reference voltage, each of the comparator and the OR circuit output the low level signal, and when the voltage at two ends of the first resistor of one of the LED strings is smaller than the first reference voltage, the comparator corresponding to one of the LED string and the OR circuit outputs high level signal.

Wherein the switch circuit includes a second resistor, a third resistor, a second MOS transistor, and a third MOS transistor; and wherein one end of the second resistor connects to one end of the fourth resistor, the other end of the second resistor connects to the drain of the second MOS transistor, a source of the second MOS transistor connects to the other end of the fourth resistor, a gate of the second MOS transistor connects to a drain of the third MOS transistor, the source of the third MOS transistor is grounded, and the gate of the third MOS transistor connects to an output end of the OR circuit.

Wherein the boost circuit includes an inductor, a first MOS transistor and a rectifier diode, wherein one end of the inductor receives the DC voltage, and the other end of the inductor connects to an anode of the rectifier diode, the anode of the rectifier diode connects to each of the LED strings, the drain of the first MOS transistor connects between the inductor and the anode of the rectifier diode, the source of the first MOS transistor connects to one end of a fourth resistor, and the gate of the first MOS transistor connects to a backlight driving IC.

Wherein the short-connection protection circuit further includes a signal enhancement circuit for increasing the level signals output by the OR circuit and for outputting the enhanced level signals to the switch circuit.

Wherein the signal enhancement circuit may be a Totem Pole circuit.

Wherein the signal enhancement circuit includes a first triode and a second triode, and wherein an emitter of the first triode connects together with the emitter of the second triode, and connects to the switch circuit, a base of the first transistor connects together with the base of the second transistor and then connects to the output end of the OR circuit, a collector of the first triode receives a third reference voltage, and the collector of the second triode is grounded.

In view of the above, when one of the resistors of the LED string is short-connected, the output power of the boost circuit is reduced to prevent the electronic components within the driving circuit from being burn out, and thus the safety and reliability are enhanced.

DETAILED DESCRIPTION OF THE EMBODIMENTS

Embodiments of the invention will now be described more fully hereinafter with reference to the accompanying drawings, in which embodiments of the invention are shown.

Figure 1:
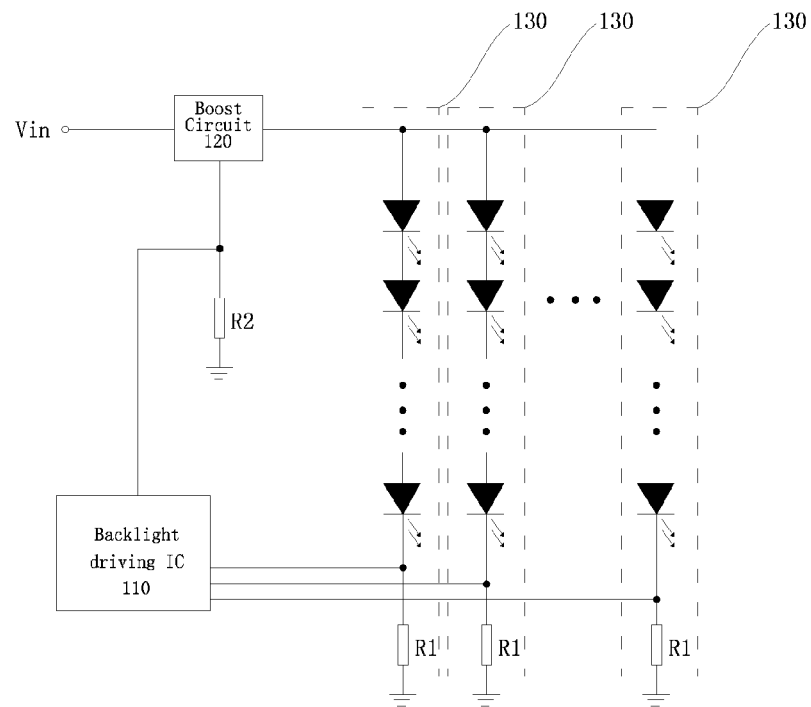
FIG. 1 is a schematic view of a conventional LED backlight source adopted in LCDs.
Figure 2:
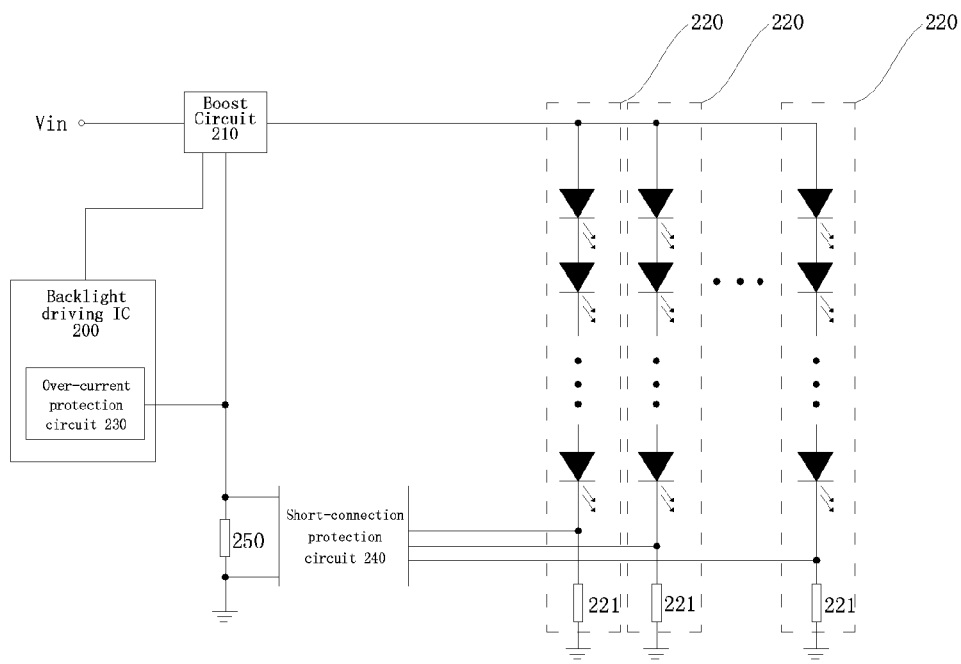
FIG. 2 is a schematic view of the LED backlight source adopted in LCDs in accordance with one embodiment.

FIG. 2 is a schematic view of the LED backlight source adopted in LCDs in accordance with one embodiment.

As shown in FIG. 2, the LED backlight source includes a boost circuit 210, a plurality of LED strings 220 connected in parallel, an over-current protection circuit 230, and a short-connection protection circuit 240.

The boost circuit 210 is for boosting the input DC voltage (Vin) and then outputs the boosted DC voltage.

The LED strings 220 are configured behind the liquid crystal panel of the LCD to operate as the backlight. Each of the LED strings 220 includes a plurality of LEDs serially connected and first resistors 221. In addition, each of the LED strings 220 receives the boosted DC voltage from the boost circuit 210 so as to emit lights normally.

The over-current protection circuit 230 controls the output power of the boost circuit 210 according to a detected resistance. The over-current protection circuit 230 may be integrated within a backlight driving integrated circuit (IC) 200. The backlight driving IC 200 changes the duty cycle of the driving signals output to the boost circuit 210 according to the control signals output from the over-current protection circuit 230. As such, the output power of the boost circuit 120 is controlled.

The short-connection protection circuit 240 adjusts the resistance detected by the over-current protection circuit 230 according to the voltage at two ends of the first resistor 221. It is to be noted that the voltage at two ends of the first resistor 221 relates to the potential difference between two ends of the first resistor 221.

Figure 3:
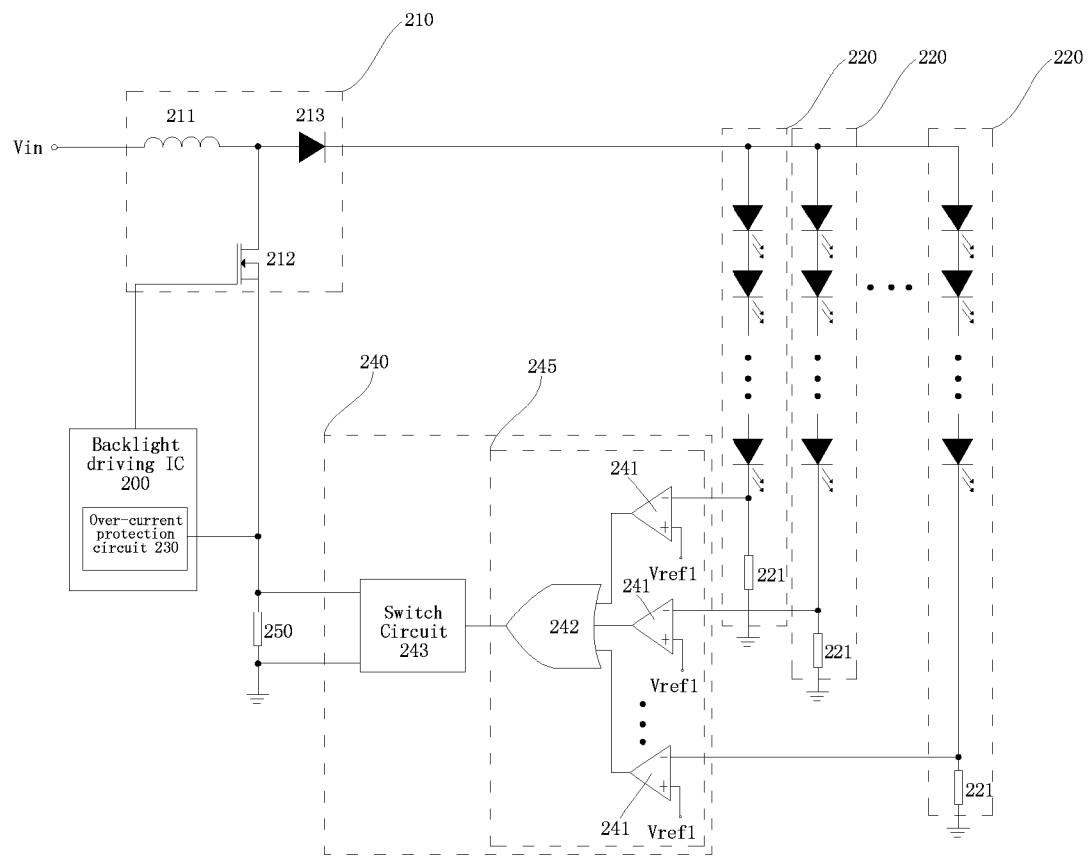
FIG. 3 is a circuit diagram showing the boost circuit and the over-current protection circuit in accordance with one embodiment.

The short-connection protection circuit 240 compares the voltage at two ends of the first resistor 221 of the LED strings 220 with a first reference voltage (Vref1 in FIG. 3). When the voltage at two ends of the first resistor 221 of the LED strings 220 is smaller than the first reference voltage, the short-connection protection circuit 240 increases the resistance detected by the over-current protection circuit 230 so as to reduce the output power of the boost circuit 210. When the voltage at two ends of the first resistor 221 of the LED strings 220 is greater than the first reference voltage, the short-connection protection circuit 240 decreases the resistance detected by the over-current protection circuit 230 so as to increase the output power of the boost circuit 210.

FIG. 3 is a circuit diagram showing the boost circuit and the over-current protection circuit in accordance with one embodiment.

As shown in FIG. 3, the boost circuit 210 includes an inductor 211, a first MOS transistor 212, and a rectifier diode 213.

One end of the inductor 211 receives the DC voltage (Vin), and the other end of the inductor 211 connects to an anode of the rectifier diode 213. The anode of the rectifier diode 213 connects to each of the LED strings 220. The drain of the first MOS transistor 212 connects between the inductor 211 and the anode of the rectifier diode 213. The source of the first MOS transistor 212 connects to one end of a fourth resistor 250. The gate of the first MOS transistor 212 connects to the backlight driving IC 200.

The short-connection protection circuit 240 includes a detecting circuit 245 and a switch circuit 243. The detecting circuit 245 compares the voltage at two ends of the first resistor 221 of each of the LED strings 220 with the first reference voltage, and then outputs different level signals based on a comparison result. The switch circuit 243 adjusts the resistance detected by the over-current protection circuit 230 according to the level signals output from the detecting circuit 245.

Specifically, the detecting circuit 245 includes a plurality of comparators 241 and an OR circuit 242. Each of the comparators 241 compares the voltage at two ends of the corresponding first resistor 221 of the LED strings 220 with the first reference voltage (Vref1). When the voltage at two ends of first resistor 221 of each of the LED strings 220 are greater than the first reference voltage (Vref1), each comparators 241 outputs low level signals. When the voltage at two ends of the first resistor 221 of the LED strings 220 are smaller than the first reference voltage (Vref1), each comparators 241 outputs high level signals. The OR circuit 242 outputs the low level signals when one of the comparators 241 outputs the low level signals, and the OR circuit 242 outputs the high level signals when one of the comparators 241 outputs the high level signals. The switch circuit 243 decreases the resistance detected by the over-current protection circuit 230 in response to the low level signals output by the OR circuit 242. The switch circuit 243 increases the resistance detected by the over-current protection circuit 230 in response to the high level signals output by the OR circuit 242.

Figure 4:
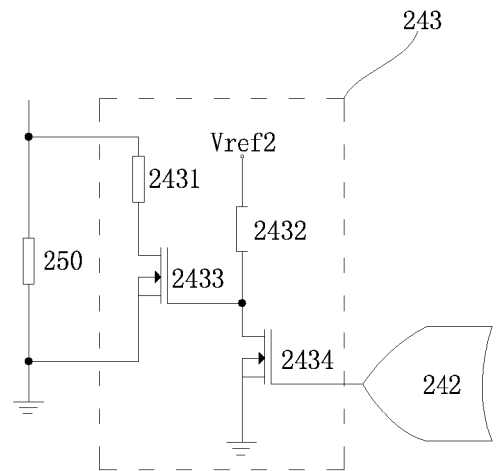
FIG. 4 is a circuit diagram showing the switch circuit in accordance with one embodiment.

FIG. 4 is a circuit diagram showing the switch circuit in accordance with one embodiment.

As shown in FIG. 4, the switch circuit 243 includes a second resistor 2431, a third resistor 2432, a second MOS transistor 2433, and a third MOS transistor 2434.

One end of the second resistor 2431 connects to one end of the fourth resistor 250. The other end of the second resistor 2431 connects to the drain of the second MOS transistor 2433. The source of the second MOS transistor 2433 connects to the other end of the fourth resistor 250. The gate of the second MOS transistor 2433 connects to the drain of the third MOS transistor 2434. One end of the third resistor 2432 receives a second reference voltage (Vref2), such as 5V. The other end of the third resistor 2432 connects to the drain of the third MOS transistor 2434. The source of the third MOS transistor 2434 is grounded. The gate of the third MOS transistor 2434 connects to an output end of the OR circuit 242.

When the driving circuit of the LED backlight source operates normally, each of the comparators 241 outputs low level signals, and the OR circuit 242 outputs low level signals. The third MOS transistor 2434 is turn off and the second MOS transistor 2433 is turn on. The resistance detected by the over-current protection circuit 230 is the resistance formed by the second resistor 2431 and the fourth resistor 250 connected in parallel. When the driving circuit of the LED backlight source operates abnormally, such as the first resistor 221 of one of the LED strings 220 is short-connected, a corresponding comparators 241 of the LED strings 220 outputs the high level signals, and the OR circuit 242 outputs the high level signals. The third MOS transistor 2434 is turn on, and the second MOS transistor 2433 is turn off. The resistance detected by the over-current protection circuit 230 is the resistance of the fourth resistor 250. As the resistance of the fourth resistor 250 is larger than that formed by the second resistor 2431 and the fourth resistor 250 connected in parallel, the backlight driving IC 200 decreases the duty cycle of the driving signals output to the first MOS transistor 212 before the over-current protection circuit 230 reaches a rated voltage. As such, the current passing the branch of the first MOS transistor 212 is decreased. The current input to the driving circuit of the LED backlight source is positively dependent on the current passing the branch of the first MOS transistor 212. When the current input to the driving circuit of the LED backlight source is decreased and the DC voltage (Vin) remains, the power input to the driving circuit of the LED backlight source is decreased, and so does the output power of the boost circuit 210.

Figure 5:
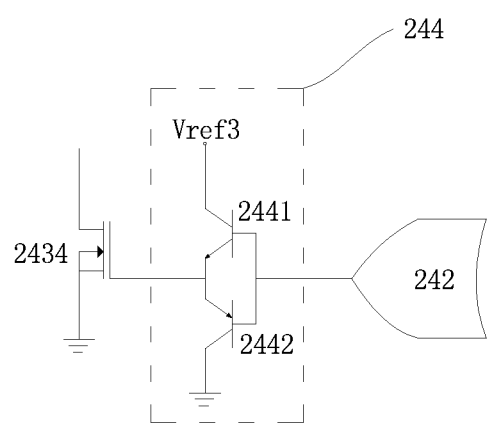
FIG. 5 is a circuit diagram showing the signal enhancement circuit in accordance with one embodiment.

FIG. 5 is a circuit diagram showing the signal enhancement circuit in accordance with one embodiment.

As shown in FIG. 5, the driving ability of the OR circuit 242 needs to be enhanced, the short-connection protection circuit 240 further includes the signal enhancement circuit 244 for increasing the level signals output by the OR circuit 242. Also, the short-connection protection circuit 240 is for outputting the enhanced level signals to the switch circuit 243.

In one embodiment, the signal enhancement circuit 244 may be a Totem Pole circuit. The signal enhancement circuit 244 includes a first triode 2441 and a second triode 2442. The emitter of the first triode 2441 connects together with the emitter of the second triode 2442, and then connects to the gate of the third MOS transistor 2434 of the switch circuit 243. A base of the first transistor 2441 connects together with the base of the second transistor 2442, and then connects to the output end of the OR circuit 242. The collector of the first triode 2441 receives a third reference voltage (Vref3), such as 5V, and the collector of the second triode 2442 is grounded.

In view of the above, when one of the resistors of the LED string is short-connected, the output power of the boost circuit is reduced to prevent the electronic components within the driving circuit from being burn out, and thus the safety and reliability are enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A LED backlight source for a liquid crystal device, comprising:
   a boost circuit for boosting an input DC voltage and for outputting the boosted DC voltage;
   a plurality of LED strings connected in parallel, wherein each of the LED strings comprises a plurality of serially connected LEDs and a first resistor, and each of the LED strings receives the boosted DC voltage from the boost circuit;
an over-current protection circuit for controlling an output power of the boost circuit according to a detected resistance;
   a short-connection protection circuit for adjusting the resistance detected by the over-current protection circuit according to a voltage at two ends of the first resistor;
   wherein when the voltage at two ends of the first resistor of one of the LED strings is smaller than a first reference voltage, the short-connection protection circuit increases the resistance detected by the over-current protection circuit so as to reduce the output power of the boost circuit, and when the voltage at two ends of the first resistor of one of the LED strings is greater than the first reference voltage, the short-connection protection circuit decreases the resistance detected by the over-current protection circuit so as to increase the output power of the boost circuit;
   wherein the short-connection protection circuit comprises:
   a detecting circuit for comparing the voltage at two ends of the first resistor of each of the LED strings with the first reference voltage and for outputting different level signals based on a comparison result;
   a switch circuit for adjusting the resistance detected by the over-current protection circuit according to the level signals output from the detecting circuit; and
   wherein when the voltage at two ends of first resistor of each of the LED strings are greater than the first reference voltage, the detecting circuit outputs low level signals, and when the voltage at two ends of first resistor of the LED strings are smaller than the first reference voltage, the detecting circuit outputs high level signals, and the switch circuit increases the resistance detected by the over-current protection circuit.

2. The LED backlight source as claimed in claim 1, wherein the detecting circuit comprises:
   a plurality of comparators for comparing the voltage at two ends of the corresponding first resistor of the LED strings with the first reference voltage;
   an OR circuit for outputting different level signals according to the level signals output from each of the comparators; and
   wherein when the voltage at two ends of the first resistor of each of the LED strings are greater than the first reference voltage, each of the comparator and the OR circuit output the low level signal, and when the voltage at two ends of the first resistor of one of the LED strings is smaller than the first reference voltage, the comparator corresponding to one of the LED string and the OR circuit outputs high level signal.

3. The LED backlight source as claimed in claim 1, wherein the switch circuit comprises a second resistor, a third resistor, a second MOS transistor, and a third MOS transistor; and
   wherein one end of the second resistor connects to one end of the fourth resistor, the other end of the second resistor connects to the drain of the second MOS transistor, a source of the second MOS transistor connects to the other end of the fourth resistor, a gate of the second MOS transistor connects to a drain of the third MOS transistor, the source of the third MOS transistor is grounded, and the gate of the third MOS transistor connects to an output end of the OR circuit.

4. The LED backlight source as claimed in claim 1, wherein the boost circuit comprises an inductor, a first MOS transistor and a rectifier diode, wherein one end of the inductor receives the DC voltage, and the other end of the inductor connects to an anode of the rectifier diode, the anode of the rectifier diode connects to each of the LED strings, the drain of the first MOS transistor connects between the inductor and the anode of the rectifier diode, the source of the first MOS transistor connects to one end of a fourth resistor, and the gate of the first MOS transistor connects to a backlight driving IC.

5. The LED backlight source as claimed in claim 1, wherein the short-connection protection circuit further comprises a signal enhancement circuit for increasing the level signals output by the OR circuit and for outputting the enhanced level signals to the switch circuit.

6. The LED backlight source as claimed in claim 5, wherein the signal enhancement circuit may be a Totem Pole circuit.

7. The LED backlight source as claimed in claim 5, wherein the signal enhancement circuit comprises a first triode and a second triode, and wherein an emitter of the first triode connects together with the emitter of the second triode, and connects to the switch circuit, a base of the first transistor connects together with the base of the second transistor and then connects to the output end of the OR circuit, a collector of the first triode receives a third reference voltage, and the collector of the second triode is grounded.

8. A liquid crystal device comprising a LED backlight source and a liquid crystal panel arranged opposite to the LED backlight source, the LED backlight source provides a light source to the liquid crystal panel such that the liquid crystal panel is capable of displaying images, the LED backlight source comprising:
   a boost circuit for boosting an input DC voltage and for outputting the boosted DC voltage;
   a plurality of LED strings connected in parallel, wherein each of the LED strings comprises a plurality of serially connected LEDs and a first resistor, and each of the LED strings receives the boosted DC voltage from the boost circuit;
   an over-current protection circuit for controlling an output power of the boost circuit according to a detected resistance;
   a short-connection protection circuit for adjusting the resistance detected by the over-current protection circuit according to a voltage at two ends of the first resistor;
   wherein when the voltage at two ends of the first resistor of one of the LED strings is smaller than a first reference voltage, the short-connection protection circuit increases the resistance detected by the over-current protection circuit so as to reduce the output power of the boost circuit, and when the voltage at two ends of the first resistor of one of the LED strings is greater than the first reference voltage, the short-connection protection circuit decreases the resistance detected by the over-current protection circuit so as to increase the output power of the boost circuit;
   wherein the short-connection protection circuit comprises:
   a detecting circuit for comparing the voltage at two ends of the first resistor of each of the LED strings with the first reference voltage and for outputting different level signals based on a comparison result;

a switch circuit for adjusting the resistance detected by the over-current protection circuit according to the level signals output from the detecting circuit; and wherein when the voltage at two ends of first resistor of each of the LED strings are greater than the first reference voltage, the detecting circuit outputs low level signals, and when the voltage at two ends of first resistor of the LED strings are smaller than the first reference voltage, the detecting circuit outputs high level signals, and the switch circuit increases the resistance detected by the over-current protection circuit.

9. The liquid crystal device as claimed in claim 8, wherein the detecting circuit comprises:

a plurality of comparators for comparing the voltage at two ends of the corresponding first resistor of the LED strings with the first reference voltage;

an OR circuit for outputting different level signals according to the level signals output from each of the comparators; and wherein when the voltage at two ends of the first resistor of each of the LED strings are greater than the first reference voltage, each of the comparator and the OR circuit output the low level signal, and when the voltage at two ends of the first resistor of one of the LED strings is smaller than the first reference voltage, the comparator corresponding to one of the LED string and the OR circuit outputs high level signal.

10. The liquid crystal device as claimed in claim 8, wherein the switch circuit comprises a second resistor, a third resistor, a second MOS transistor, and a third MOS transistor; and wherein one end of the second resistor connects to one end of the fourth resistor, the other end of the second resistor connects to the drain of the second MOS transistor, a source of the second MOS transistor connects to the other end of the fourth resistor, a gate of the second MOS transistor connects to a drain of the third MOS transistor, the source of the third MOS transistor is grounded, and the gate of the third MOS transistor connects to an output end of the OR circuit.

11. The liquid crystal device as claimed in claim 8, wherein the boost circuit comprises an inductor, a first MOS transistor and a rectifier diode, wherein one end of the inductor receives the DC voltage, and the other end of the inductor connects to an anode of the rectifier diode, the anode of the rectifier diode connects to each of the LED strings, the drain of the first MOS transistor connects between the inductor and the anode of the rectifier diode, the source of the first MOS transistor connects to one end of a fourth resistor, and the gate of the first MOS transistor connects to a backlight driving IC.

12. The liquid crystal device as claimed in claim 8, wherein the short-connection protection circuit further comprises a signal enhancement circuit for increasing the level signals output by the OR circuit and for outputting the enhanced level signals to the switch circuit.

13. The liquid crystal device as claimed in claim 12, wherein the signal enhancement circuit may be a Totem Pole circuit.

14. The liquid crystal device as claimed in claim 12, wherein the signal enhancement circuit comprises a first triode and a second triode, and wherein an emitter of the first triode connects together with the emitter of the second triode, and connects to the switch circuit, a base of the first transistor connects together with the base of the second transistor and then connects to the output end of the OR circuit, a collector of the first triode receives a third reference voltage, and the collector of the second triode is grounded.

* * * * *